(12) United States Patent
Sourani (10) Patent No.: US 8,228,579 B2
(45) Date of Patent: Jul. 24, 2012

(54) OPTICAL DEVICE FOR PROJECTION OF OPTICAL BEAMS

(75) Inventor: Sason Sourani, Hod Hasharon (IL)

(73) Assignee: Btendo Ltd., Kfar Saba (IL)

( * ) Notice: Subject to any disclaimer, the term of this patent is extended or adjusted under 35 U.S.C. 154(b) by 319 days.

(21) Appl. No.: 12/674,101

(22) PCT Filed: Aug. 18, 2008

(86) PCT No.: PCT/IL2008/001135
§ 371 (c)(1),
(2), (4) Date: Feb. 18, 2010

(87) PCT Pub. No.: WO2009/024969
PCT Pub. Date: Feb. 26, 2009

(65) Prior Publication Data
US 2011/0149360 A1 Jun. 23, 2011

(30) Foreign Application Priority Data
Aug. 19, 2007 (IL) .......................................... 185355

(51) Int. Cl.
*G02B 5/08* (2006.01)
*G02B 26/08* (2006.01)
*G02B 26/10* (2006.01)

(52) U.S. Cl. ............... 359/201.2; 359/202.1; 359/208.1; 359/225.1; 359/226.1; 359/861

(58) Field of Classification Search .............. 359/201.1, 359/202.1, 208.1, 208.2, 225.1, 226.1, 861, 359/201.2
See application file for complete search history.

(56) References Cited

U.S. PATENT DOCUMENTS

| | | | |
|---|---|---|---|
| 3,647,956 A | | 3/1972 | Buck et al. |
| 3,669,522 A | | 6/1972 | Anderson |
| 3,748,014 A | * | 7/1973 | Beiser .......................... 359/201.1 |
| 3,801,180 A | | 4/1974 | MaGuire et al. |
| 4,111,531 A | * | 9/1978 | Lavelle et al. ................. 359/861 |
| 4,368,488 A | * | 1/1983 | Sakamoto ....................... 348/205 |
| 4,497,540 A | * | 2/1985 | Breckinridge et al. ........ 359/615 |
| 4,997,242 A | * | 3/1991 | Amos ........................... 359/202.1 |
| 5,168,386 A | | 12/1992 | Galbraith |
| 5,291,273 A | | 3/1994 | Gelbart |
| 5,565,979 A | * | 10/1996 | Gross ......................... 356/237.2 |

(Continued)

FOREIGN PATENT DOCUMENTS

EP 1388747 A1 2/2004

(Continued)

*Primary Examiner* — Ricky D Shafer
(74) *Attorney, Agent, or Firm* — Browdy and Neimark, PLLC (57) ABSTRACT

An optical device is provided for projecting a light beam. The device comprises a first planar reflector movable about a first axis is disposed in a path of a focused light beam for deflecting the incident light beam; a concave reflective surface fixed in position located in the path of the deflected light beam, has a circular shape extending along at least one of its axis and is spaced apart from the planar reflector by a distance which is approximately equal to the radius of that circular shape; and a second planar reflector moveable about a second axis located in a plane substantially vertical to a plane comprising the first axis and wherein the second planar reflector is positioned in the path of the light reflected by the concave reflective surface such that the light beam is projected onto a target plane with a substantially flat field of focus.

4 Claims, 12 Drawing Sheets

U.S. PATENT DOCUMENTS

| | | | |
|---|---|---|---|
| 5,726,752 A * | 3/1998 | Uno et al. | 356/246 |
| 5,907,442 A * | 5/1999 | Matsuda | 359/858 |
| 5,920,361 A | 7/1999 | Gibeau et al. | |
| 6,211,988 B1 * | 4/2001 | Engelhardt et al. | 359/201.1 |
| 6,433,908 B2 * | 8/2002 | Seel | 359/201.1 |
| 6,836,381 B2 * | 12/2004 | Giles et al. | 359/727 |
| 6,859,329 B2 | 2/2005 | Kobayashi | |
| 2002/0122260 A1 | 9/2002 | Okazaki et al. | |
| 2007/0109509 A1 | 5/2007 | Lee | |
| 2008/0130077 A1 * | 6/2008 | Park et al. | 359/202 |

FOREIGN PATENT DOCUMENTS

| | | |
|---|---|---|
| EP | 1785769 A1 | 5/2007 |
| FR | 2143933 A1 | 2/1973 |
| GB | 2247090 A | 2/1992 |
| JP | 2001257834 A | 9/2001 |
| WO | WO2006/035378 * | 4/2006 |

* cited by examiner

OPTICAL DEVICE FOR PROJECTION OF OPTICAL BEAMS

FIELD OF THE INVENTION

The present invention relates to optical systems for scanning of deflecting a light beam, and in particular to systems which comprise periodically moving reflective elements, such as oscillating mirrors.

BACKGROUND OF THE INVENTION

Certain devices such as wafer defect scanners, laser printers, document scanners, projectors and the like make use of a narrow collimated laser beam that is usually scanned across a flat surface along a straight line path. A typical optical scanning system for this purpose employs a rotating or oscillating flat mirror to deflect the beam. The collimated input beam is aimed perpendicular to the scanning mirror's rotational axis, so that the main deflected ray sweeps a plane in space. The beam strikes the flat surface in a spot that scans along a straight line path. Beam collimation generally ensures that the spot size remains substantially the same at both the center and edges of the flat surface.

Several systems have been proposed in the art. Some of which are the following:

U.S. Pat. No. 5,291,273 describes a non-contact diameter measuring device for measuring the diameter of a stationary or rotating round object by measuring the difference in the angle of reflection of a light beam scanned along part of the circumference of the object. The scanning beam is repeatedly translated across the object and the angle of the reflected beam is detected. The distance the beam passes across the object is translated into a signal which is proportional to the diameter.

GB 2247090 discloses a scanner for use in a thermal imaging system which comprises an oscillating mirror and a powered optical system used in a double-pass mode to transmit radiation between a detector and a focal plane. During the first pass rays normal to the detector are brought to a focus on the surface of the mirror and after reflection are once more wandered parallel by the second pass. A real image of the detector is formed which on movement of the oscillating mirror scans a flat field with a telecentric pupil.

U.S. Pat. No. 5,168,386 describes a flat-field telecentric scan system, having a planar scanning reflector situated in a light path and mounted for movement about a scan axis, a concave spherical mirror fixed in a position in the light path, and a lens or mirror with spherical surface placed in the light path for providing a flat-field scan.

However, there is still a need for a compact solution which can provide a good quality images and can be applicable also to relatively small devices such as hand held projectors and the like.

SUMMARY OF THE INVENTION

It is an object of the present invention to provide a device to allow scanning and projecting the scanned image with microelectromechanical systems (MEMS) having limited mirror area.

It is another object of the present invention to provide a solution that can provide a high quality of projected images that can be used among others in hand held projectors.

Other objects of the invention will become apparent as the description of the invention proceeds.

In accordance with a first embodiment of the present invention there is provided an optical device for projecting a light beam comprising:

a first planar reflector disposed in a path of a focused light beam for deflecting the light beam incident thereon, wherein the planar reflector being movable about a first axis;

a concave reflective surface fixed in position and disposed in the path of the deflected light beam, wherein the concave reflective surface is characterized by having a circular shape extending along at least one of its axis and wherein the reflective surface being spaced away from the planar reflector by a distance approximately equal to the radius of the circular shape; and a second planar reflector moveable about a second axis located in a plane substantially vertical to a plane comprising the first axis and wherein the second planar reflector is positioned in the path of the light reflected by the concave reflective surface such that the light beam is projected onto a target plane with a substantially flat field of focus.

According to a preferred embodiment of the invention, the concave reflective surface of the optical device has a two dimensional curvature formed by the circular shape extending along one of its axis and by a another shape extending along another of its axis and wherein the other shape is selected from among the group consisting of a circular shape, a parabolic shape and an elliptic shape. Preferably, the two dimensional curvature is made of two spherical shapes, and optionally, each of the two spherical shapes has a different curvature radius then the other.

According to another preferred embodiment of the invention, at least one of the reflectors i.e. at least one of group comprising the first planar reflector, the concave reflective surface and the second planar reflector, comprises reflective microelectromechanical systems (MEMS).

DETAILED DESCRIPTION OF PREFERRED EMBODIMENTS

A better understanding of the present invention is obtained when the following non-limiting detailed examples are considered in conjunction with the attached drawings.

Figure 1:
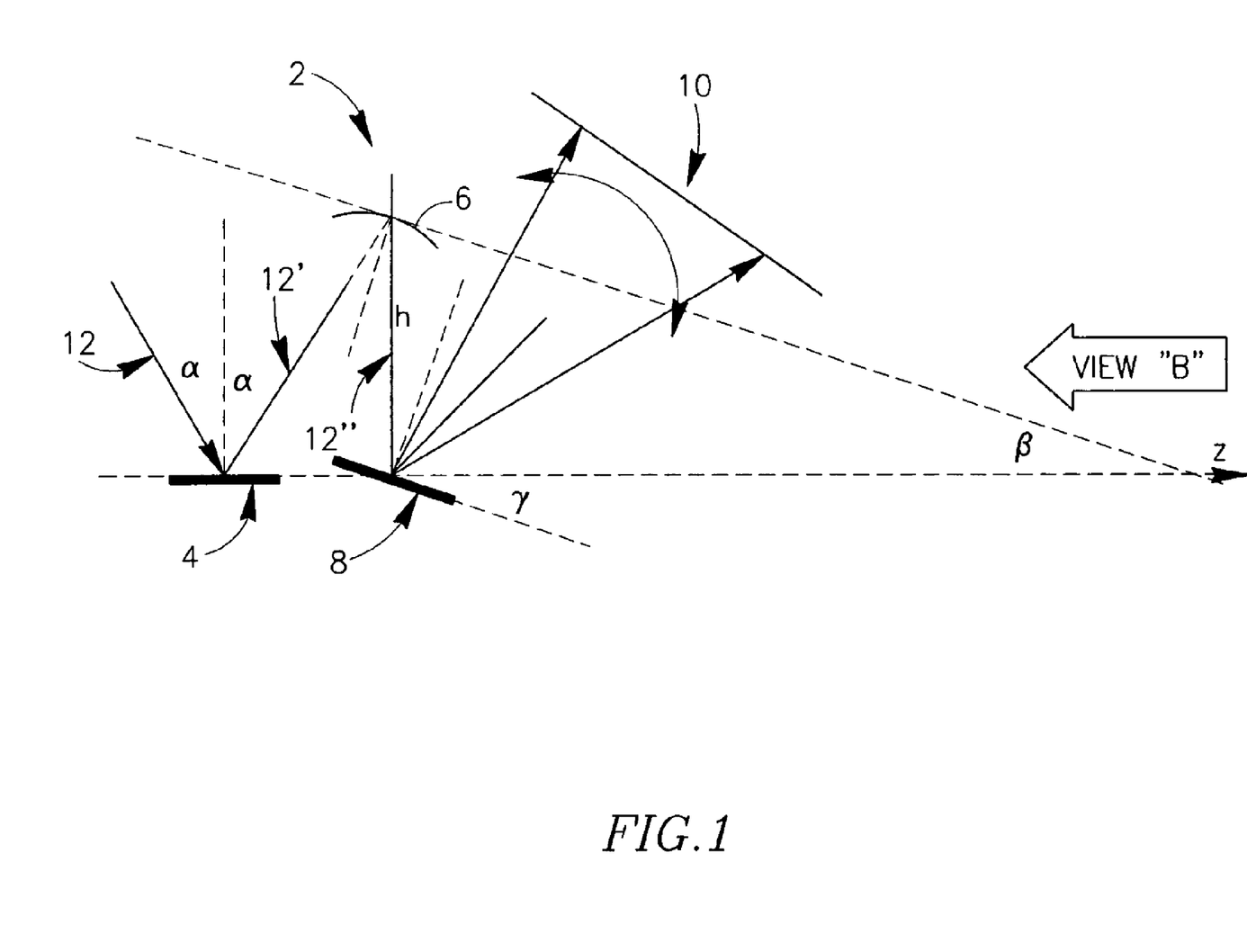
FIG. 1—presents a schematic view of an optical device operative to project a laser beam onto a target surface, construed in accordance with an embodiment of the present invention.

With reference to FIG. 1, a view "A" is illustrated of an optical projecting device 2 in accordance with an embodiment of the present invention. The device includes a substantially horizontal planar scanning reflector 4, a fixed concave mirror 6 and substantially vertical planar scanning reflector 8, all arranged serially in the path for directing an incident laser beam made up of a bundle of light rays, in a scanning motion over a target surface 10. The embodiment referred to herein has a cylindrical symmetry and will be described along cylindrical coordinates.

For the convenience of the reader, the drawings show only one ray being at the center of the laser's beam's ray bundle. The planar horizontal reflector 4 is disposed with its rotational axis along the Z axis and the rays of the laser beam 12 are incident on reflector 4 at an angle of α as shown in FIG. 1, and the beam is deflected by reflector 4 at the same angle toward fixed concave mirror 6. Reflector 4 is movable about a scan axis z so as to cause the reflected light beam 12' to describe a conical or planar surface in space.

The concave mirror 6 is fixed in position. It is disposed in cylindrical symmetry along the z axis and designed in such a way that the asymptotic line of mirror 6 at the point where the center of the Gaussian beam incidents the mirror meets the z axis at an angle of $$\beta = \frac{\alpha}{2}.$$

Figure 2:
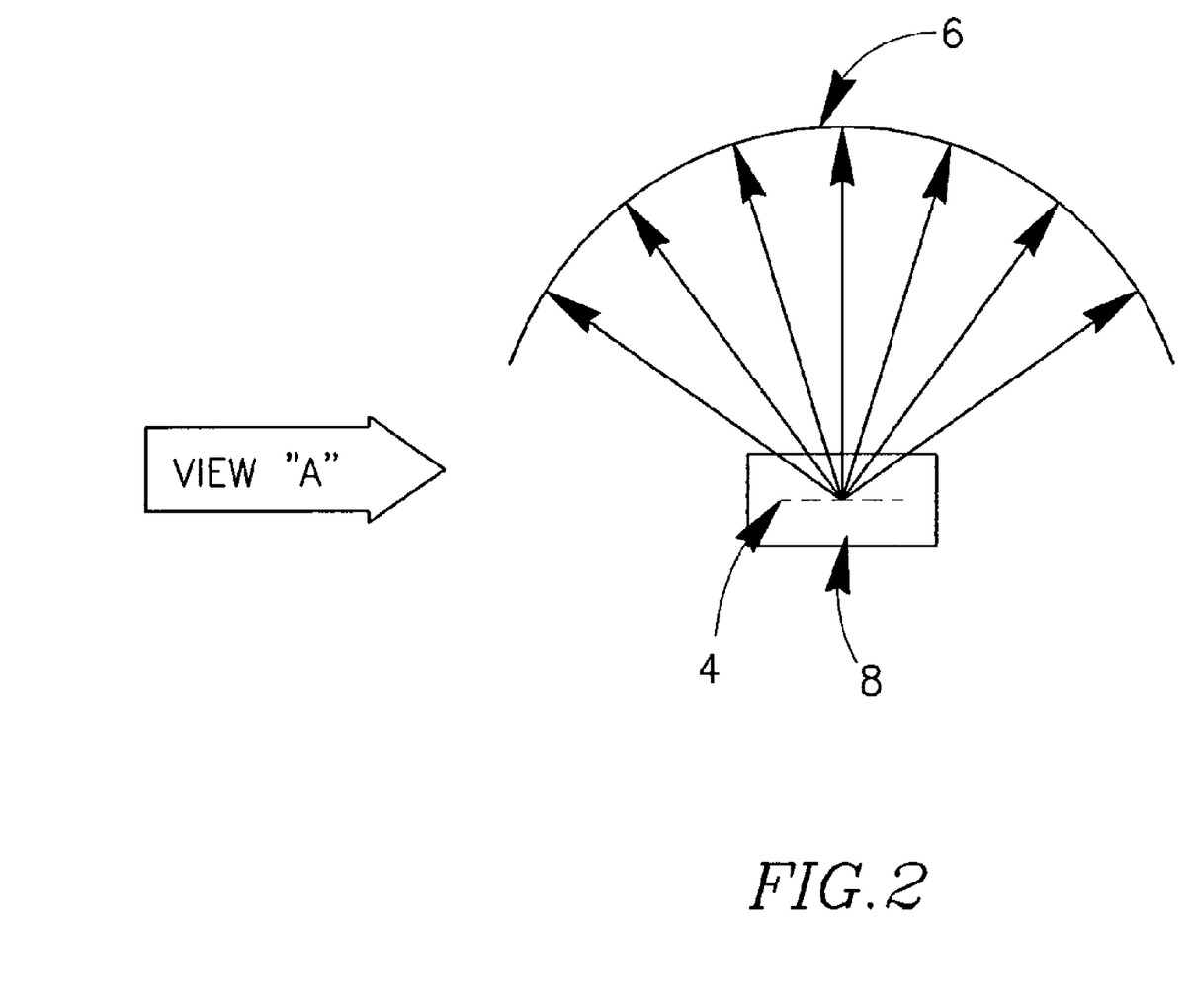
FIG. 2—presents another schematic view of the optical device presented in FIG. 1.

Mirror 6 is thus adapted to intercept laser beam 12' and redirecting the light as beam 12" from the fixed concave mirror 6 orthogonally to the axis of symmetry z toward vertical mirror 8. Mirror 6 in our example has a spherical reflective surface which is characterized by a radius of curvature. In order to obtain the projection of the image onto target surface (e.g. a screen) 10, the spacing between the point of intersection of the laser beam 12 with the planar scan mirror 4 and mirror 6 should equal to the spherical radius of mirror 6. Beam 12" that is reflected from the concave mirror 6 when horizontal mirror 4 rotates along axis z, creates a plane orthogonal to z axis when reaching vertical mirror 8. Since the vertical mirror is flat, the beam that hits the vertical mirror will result in another reflected plane. Looking via the "Z" axis as illustrated in FIG. 2, the two beams coming to and going from concave mirror 6 coincide, and the rotational movement of the horizontal mirror 4 is thus translated into the vertical mirror.

For the sake of clarity, the description of the operation of the above described set up will start from the screen and going backward towards the emitting laser.

Figure 3:
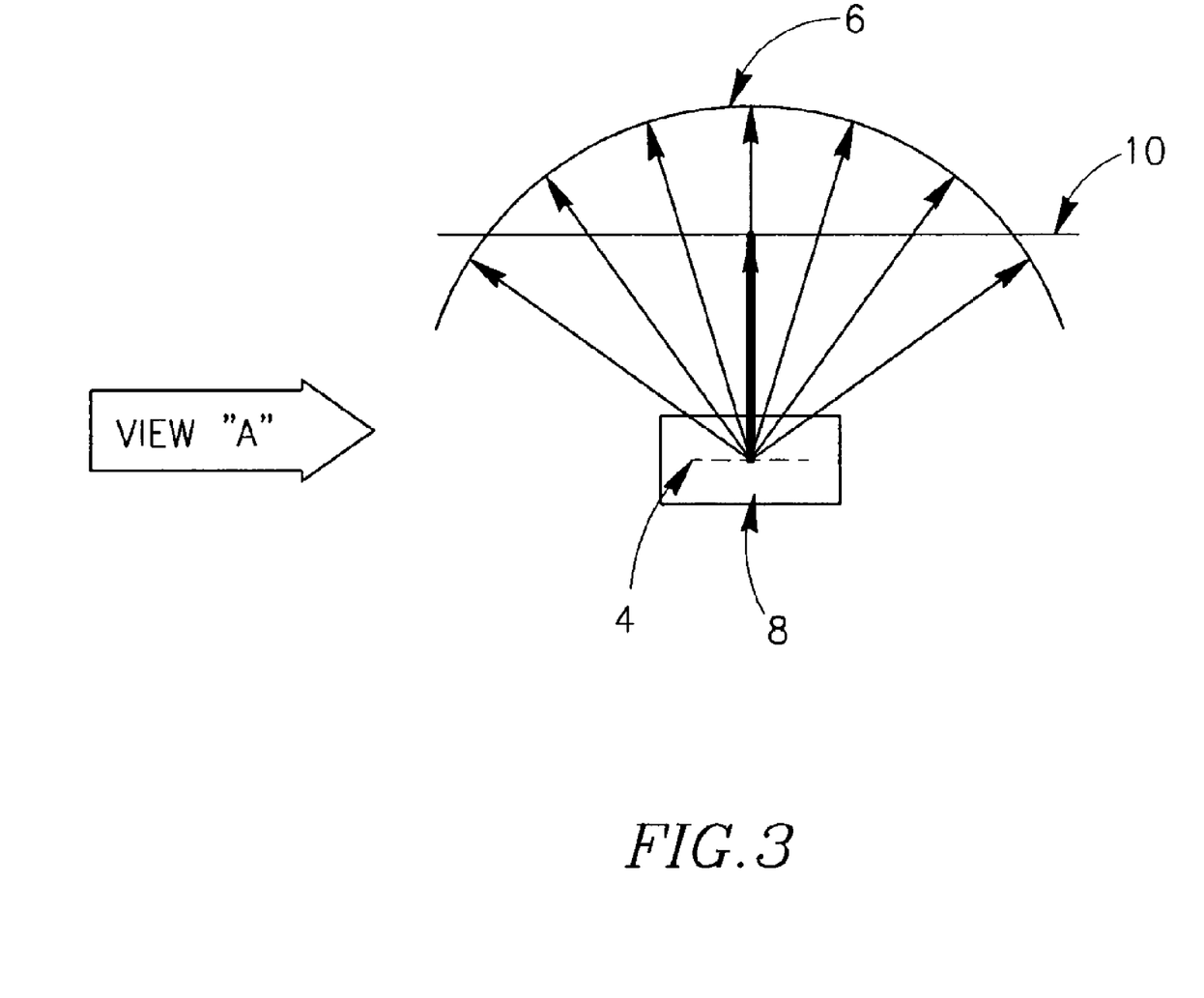
FIG. 3—illustrates a schematic view of a beam exiting the device presented in FIGS. 1 and 2 and displayed on a target screen.

The beam 14 exiting the vertical mirror 8 (FIG. 3) has a diameter of approximately 1.6 mm that will be focused onto a screen placed according to the present example, at approximately 50 cm away from the optical device.

Figure 4A:
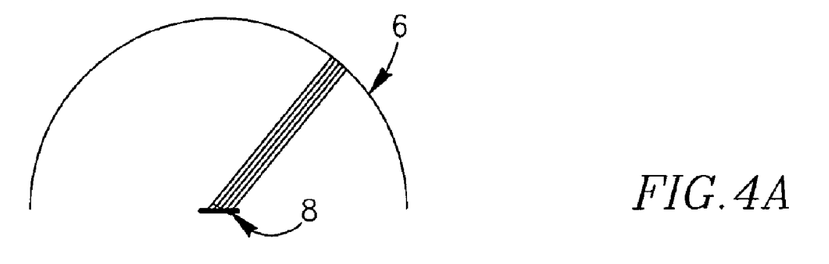
FIGS. 4A to 4C—show schematic views of beams reflected from the fixed concave mirror toward the vertical mirror.
Figure 4B:
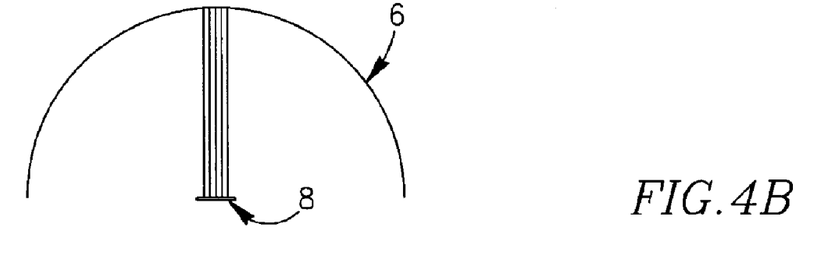
Figure 4C:
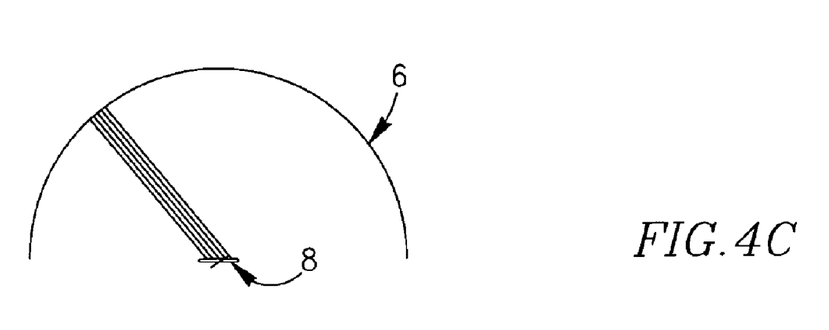

FIGS. 4A to 4C describe the beams reflected to the fixed concave mirror 6 from vertical mirror 8. As can be seen from these Figs., no major changes happen when the beam goes through that section of the device mainly because vertical mirror 8 is substantially flat.

Figure 5A:
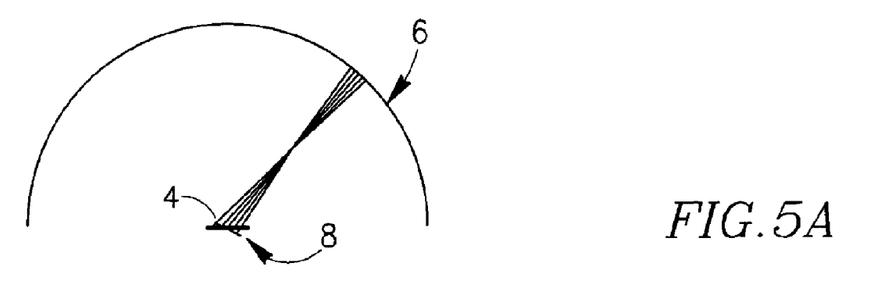
FIGS. 5A to 5C—demonstrate schematic views of beams reflected from the horizontal mirror toward the fixed concave mirror.
Figure 5B:
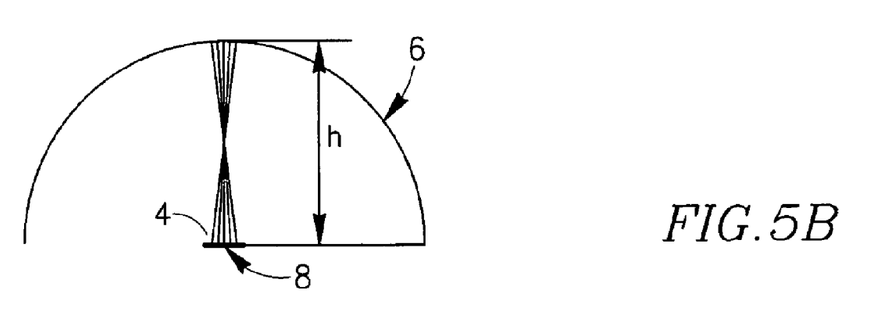
Figure 5C:
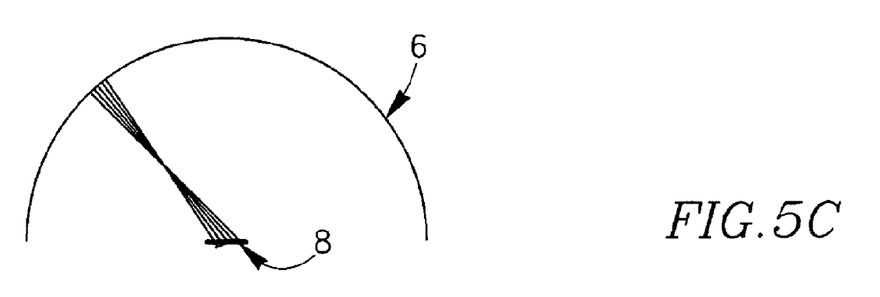

Next, FIGS. 5A to 5C illustrate the section of the optical device where the beam is reflected to horizontal mirror 4 from the fixed concave mirror 6. The radius of the concave mirror at the center of the beam is designated in FIG. 5 by "h" (at other points the radius is different and aberration may happen). In order to obtain a focused image at a distance "d" being approximately 50 cm away from the device we would need the following:

$$\frac{1}{u} + \frac{1}{v} = \frac{2}{R}$$

$$\frac{1}{u} + \frac{1}{d} = \frac{2}{h}$$

$$u = \frac{dh}{2d - h}$$

A typical value for h=1 cm is $$u = \frac{50}{99}.$$

Figure 6:
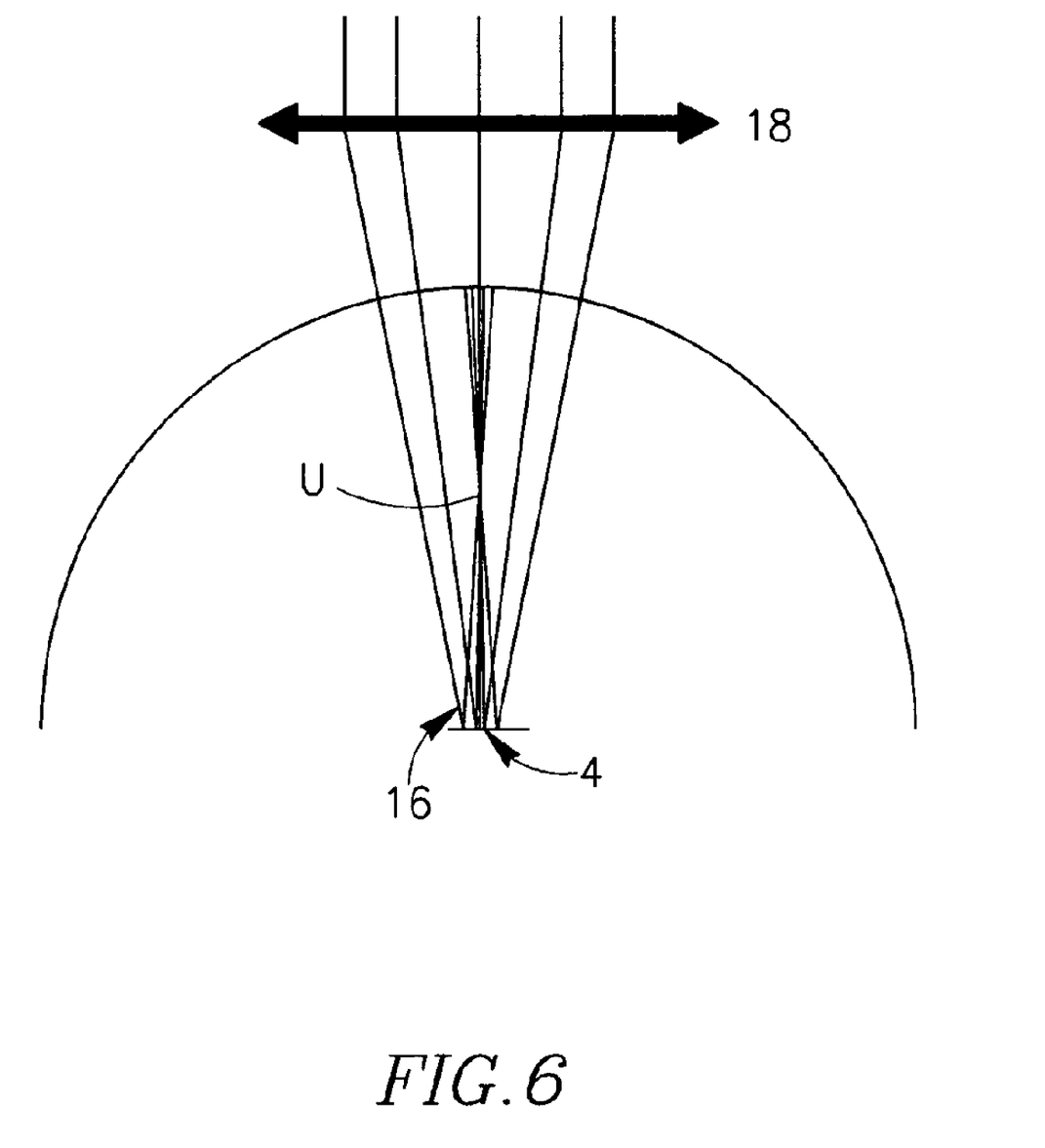
FIG. 6—presents a schematic view of a beam reflected from the focusing Lens toward the horizontal mirror.

FIG. 6 presents the section of the optical device extending between the focusing lens 18 and the horizontal mirror 4. As shown in this FIG., a collimated laser beam 16 being of several mm in diameter reaches focusing lens 18 and focuses it at the exact point "u" as calculated above.

Figure 7:
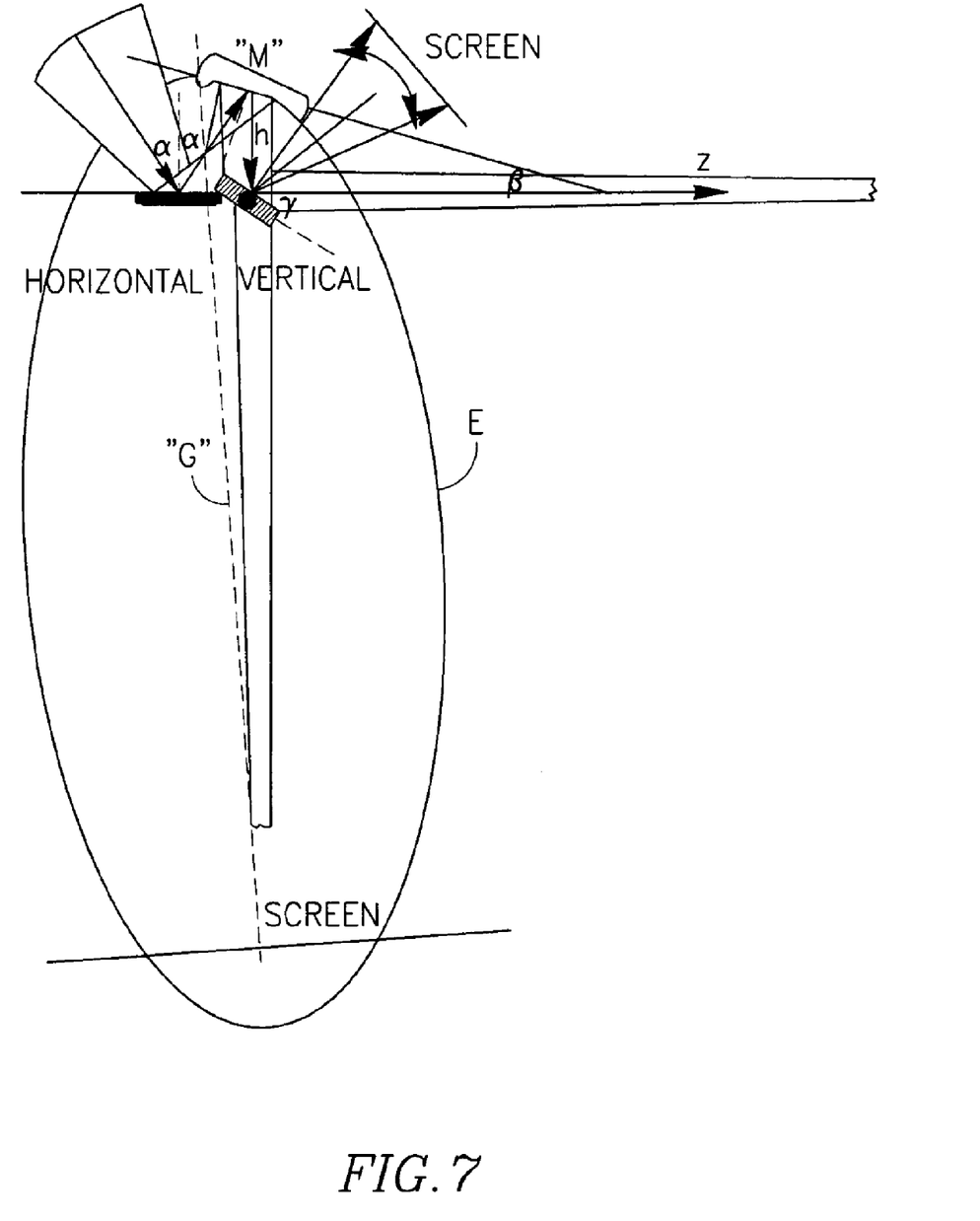
FIG. 7—presents a schematic view of beam focusing at the axis of symmetry.
Figure 8:
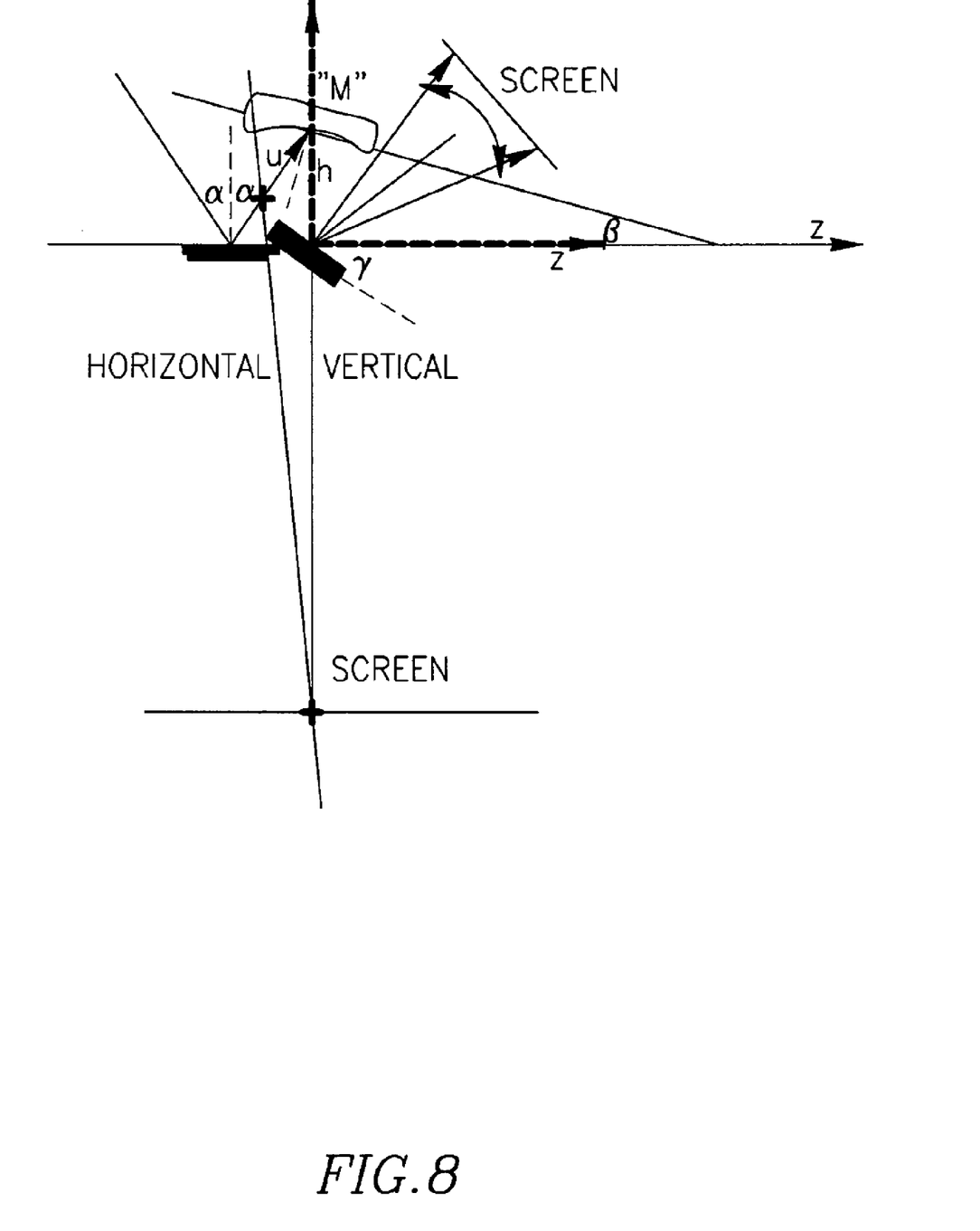
FIG. 8—illustrates the device used as a model for the mathematical analysis provided.

FIG. 7 illustrates beam focusing process at the axis of symmetry of the optical device demonstrated above. For simplicity we will concentrate on a fixed position of the horizontal mirror (which as was previously explain can rotate about its axis Z) and as was previously described, the fixed concave mirror requires that the beam be focused at point "u" (as demonstrated in FIG. 6). Further, we will relate to the imaginary image of the screen, taking into account that we need to focus the image onto the screen, so we need the beam to be focused in this view at the same point "u". A function that enables us to have these two focuses is an ellipse "E" with the major axis "G" (as shown in FIG. 7). Also, it should be noted that for a screen located at an infinite distance, the ellipse "E" reduces into a parabola.

Figure 9:
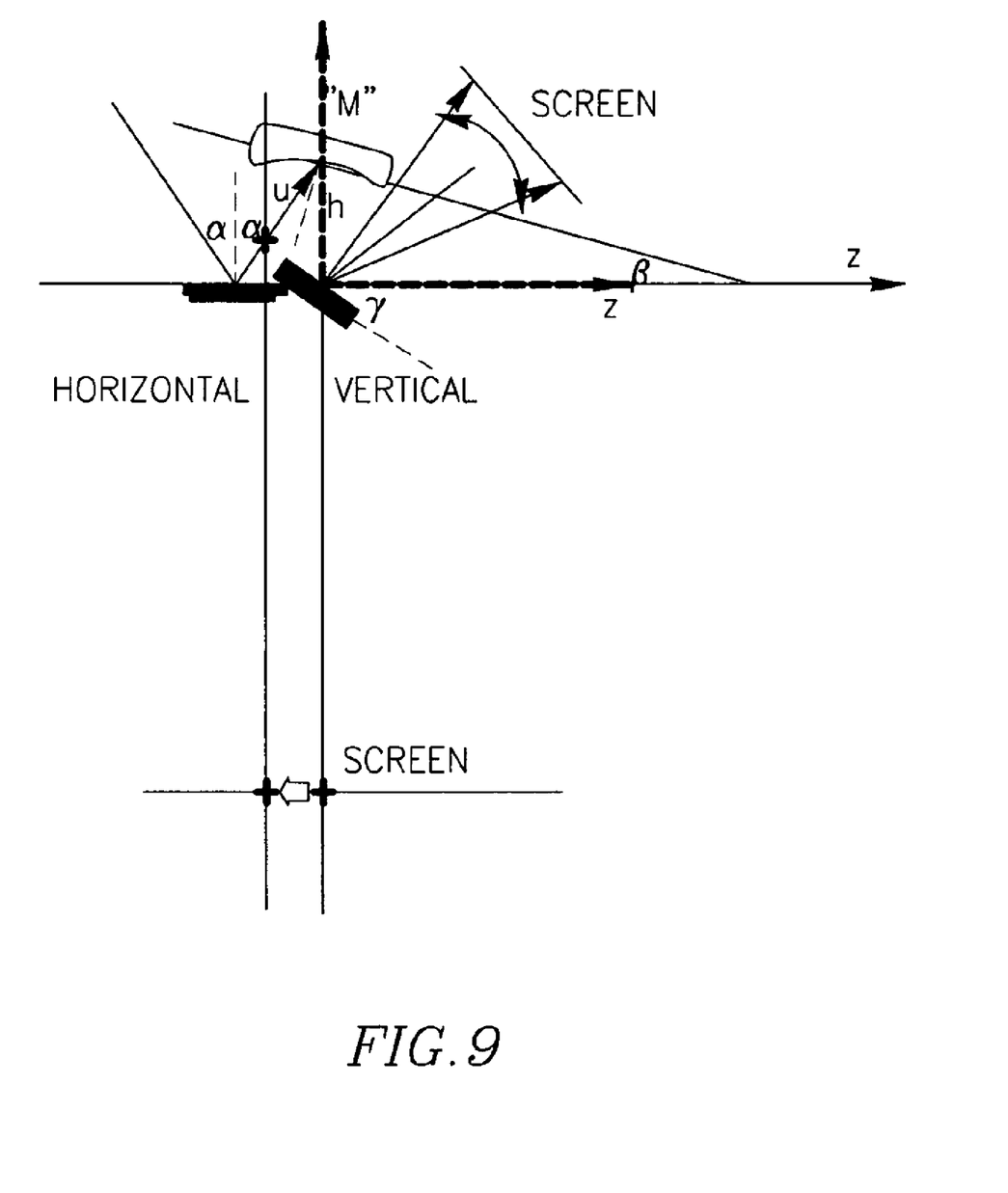
FIG. 9—shows a simplification of the model by focusing on a point perpendicular to z-axis.
Figure 10:
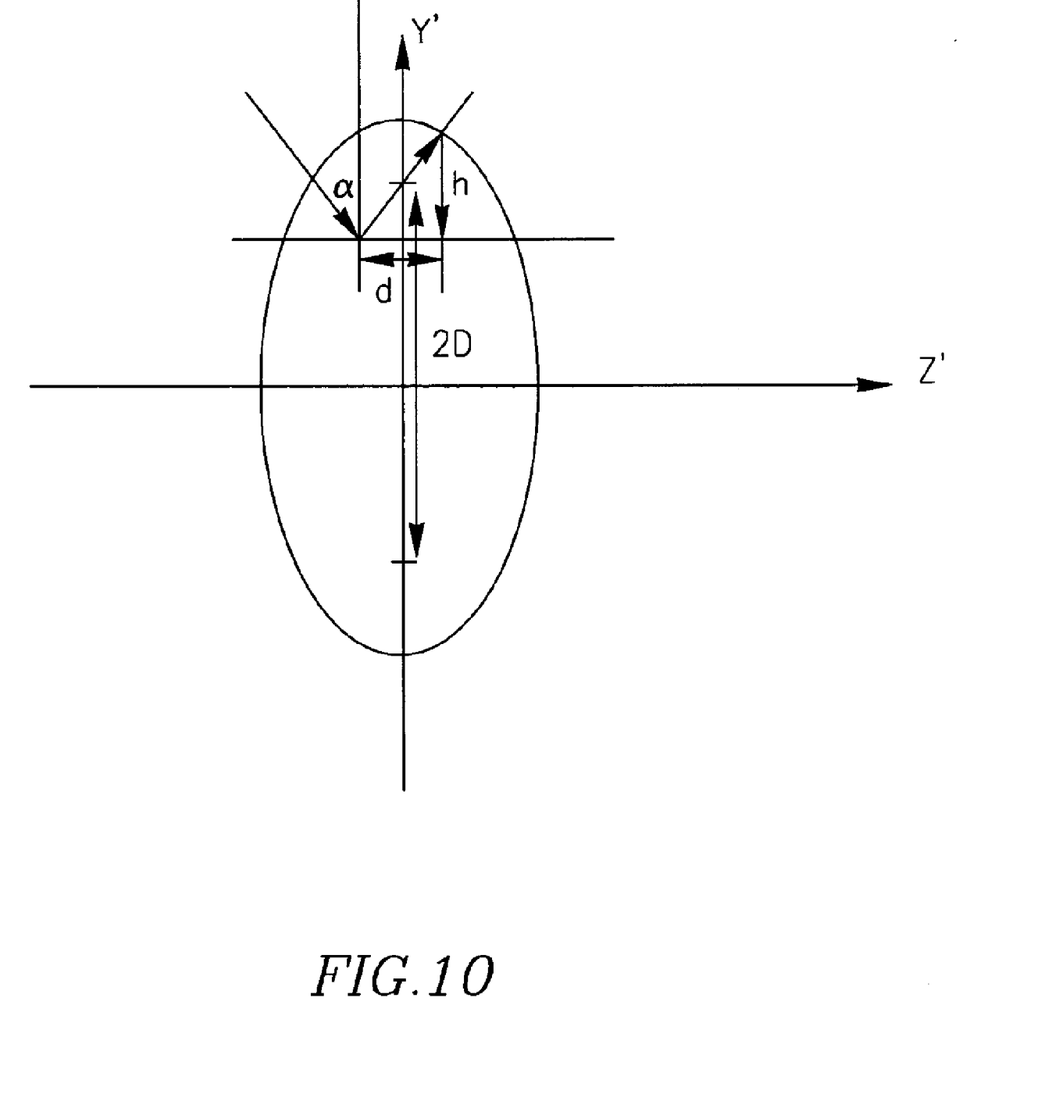
FIG. 10—presents a system where the origin of the axis is set to be at the middle of the two poles.

Let us now consider the following mathematical solution demonstrating a design of an optical device in accordance with an embodiment of the present invention. Let us first simplify the model by focusing on a point perpendicular to z-axis (as shown in FIG. 9), and let us also assume that distance between the two poles is equal to 2D. Next, let us set the origin at the middle of the two poles as shown in FIG. 10.

The top (centered) ellipse has been derived by using:

$$\frac{y'^2}{R_y^2} + \frac{z'^2}{R_z^2} = 1$$

So in order to solve the above equation we need two equations. The first equation uses the following relationship:

$$R_y^2 = D^2 + R_z^2$$

Whereas the second equation makes use of the fact that the point $$y' = D + \frac{h}{2}, \quad z' = \frac{d}{2}$$

can be found on the ellipse:

$$\frac{y'^2}{R_y^2} + \frac{z'^2}{R_z^2} = 1$$

Thus, $$h = \frac{d}{\tan\alpha}$$

$$\frac{\left(D + \frac{d}{2\tan\alpha}\right)^2}{R_y^2} + \frac{\left(\frac{d}{2}\right)^2}{R_z^2} = 1$$

$$\frac{\left(D + \frac{d}{2\tan\alpha}\right)^2}{D^2 + R_z^2} + \frac{\left(\frac{d}{2}\right)^2}{R_z^2} = 1$$

$$R_z^2\left(D + \frac{d}{2\tan\alpha}\right)^2 + D^2\left(\frac{d}{2}\right)^2 + R_z^2\left(\frac{d}{2}\right)^2 = R_z^2(D^2 + R_z^2)$$

$$R_z^4 - \left(\frac{Dd}{\tan\alpha} + \frac{d^2}{4\tan^2\alpha} + \frac{d^2}{4} - D^2\right)R_z^2 + \frac{D^2 d^2}{4} = 0$$

$$R_z^4 - \left(\frac{Dd}{\tan\alpha} + \frac{d^2}{4\sin^2\alpha} - D^2\right)R_z^2 + \frac{D^2 d^2}{4} = 0$$

"$a$" = 1

"$b$" = $-\left(\frac{Dd}{\tan\alpha} + \frac{d^2}{4\sin^2\alpha} - D^2\right)$

"$c$" = $\frac{D^2 d^2}{4}$

Figure 11:
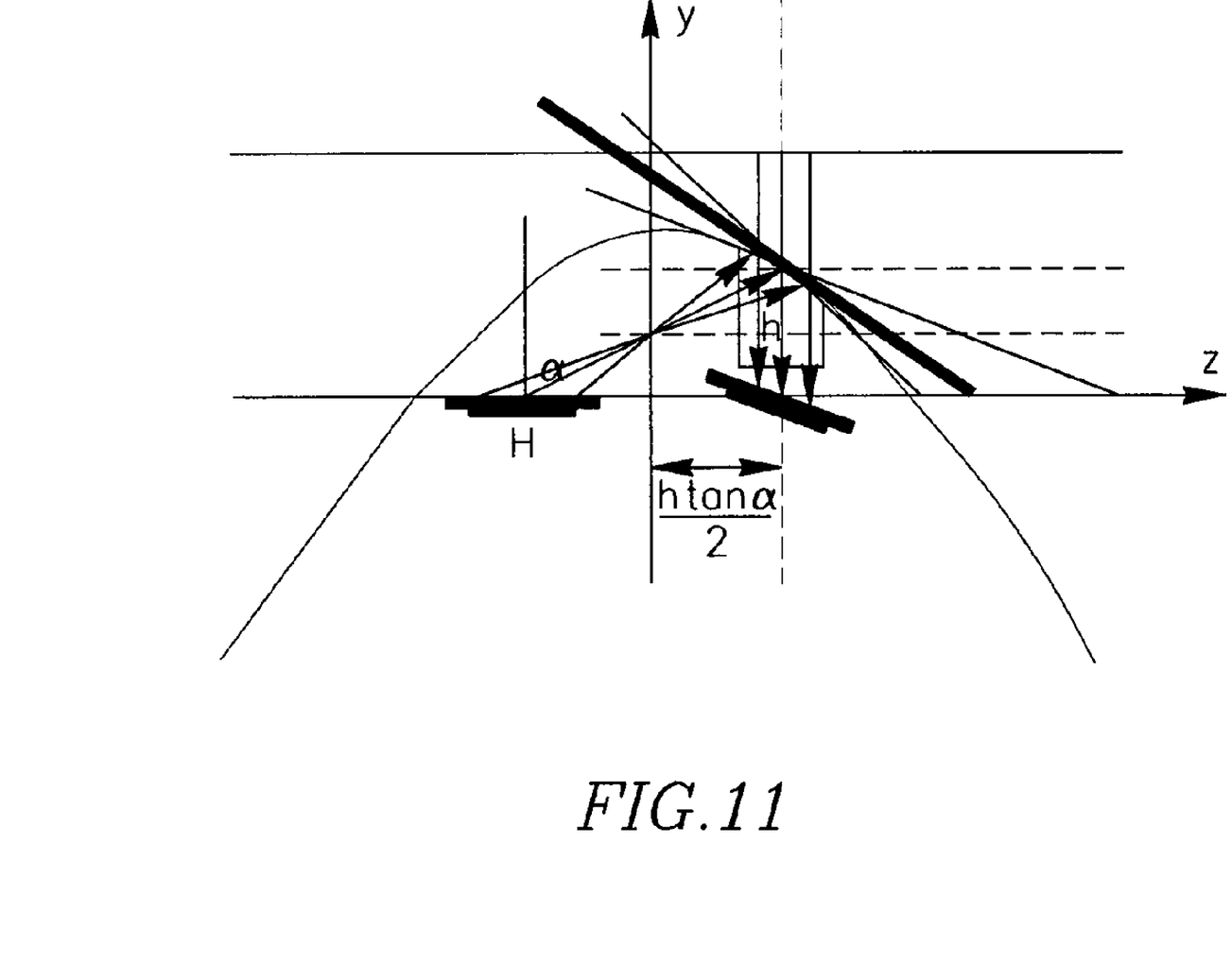
FIG. 11—presents a mathematical solution for a set of parameters substituted in the model presented.

For the case of: D=50 cm, d=6 cm, $\alpha$=30° we shall assume a parabola solution as shown in FIG. 11 of the form:

$$y = -kz^2 + c$$

The two parameters of the parabola could be derived from the following constrains:
1. For the nominal value of entry angle, $\alpha$, ray should meet the parabola at the same z value as the center of the vertical mirror.
2. At that point the tangent of the parabola should be equal to $-\beta$.

For the first constrain we have:

$$h = -k\left[\frac{h\tan\alpha}{2}\right]^2 + c$$

For the second constrain we have:

$$\frac{dy}{dz} = -2kz$$

$$\tan(\beta) = 2k\left[\frac{h\tan\alpha}{2}\right]$$

and:

$$k = \frac{\tan\beta}{h\tan\alpha} = \frac{\sin\beta\cos\alpha}{\cos\beta * 2h\sin\beta\cos\beta} = \frac{\cos\alpha}{2h\cos^2\beta} = \frac{\cos\alpha}{h(2\cos^2\beta - 1 + 1)} = \frac{\cos\alpha}{h(\cos\alpha + 1)}$$

In the last equation we used the identity of $\alpha=2\beta$. Substituting the last result in the equation set for the first constrain, one would get:

$$h = -\frac{h^2 \sin^2\alpha \cos\alpha}{4h\cos^2\alpha(\cos\alpha + 1)} + c$$

$$c = h + \frac{h\sin^2\alpha}{4\cos\alpha(\cos\alpha + 1)} = h + h\frac{1 - \cos^2\alpha}{4\cos\alpha(\cos\alpha + 1)}$$

$$c = h\left[1 + \frac{1 - \cos\alpha}{4\cos\alpha}\right] = h\frac{1 + 3\cos\alpha}{4\cos\alpha}$$

So that the solution for the parabola is:

$$y = \frac{-\cos\alpha z^2}{h(\cos\alpha + 1)} + h\frac{1 + 3\cos\alpha}{4\cos\alpha}$$

Substituting $\alpha$=15° and h=10 mm:

$$Y = -0.049133381 Z^2 + 10.08819045$$

While for $\alpha$=30° and h=10.39 mm:

$$Y = -0.044658199 Z^2 + 10.79422863$$

Figure 12:
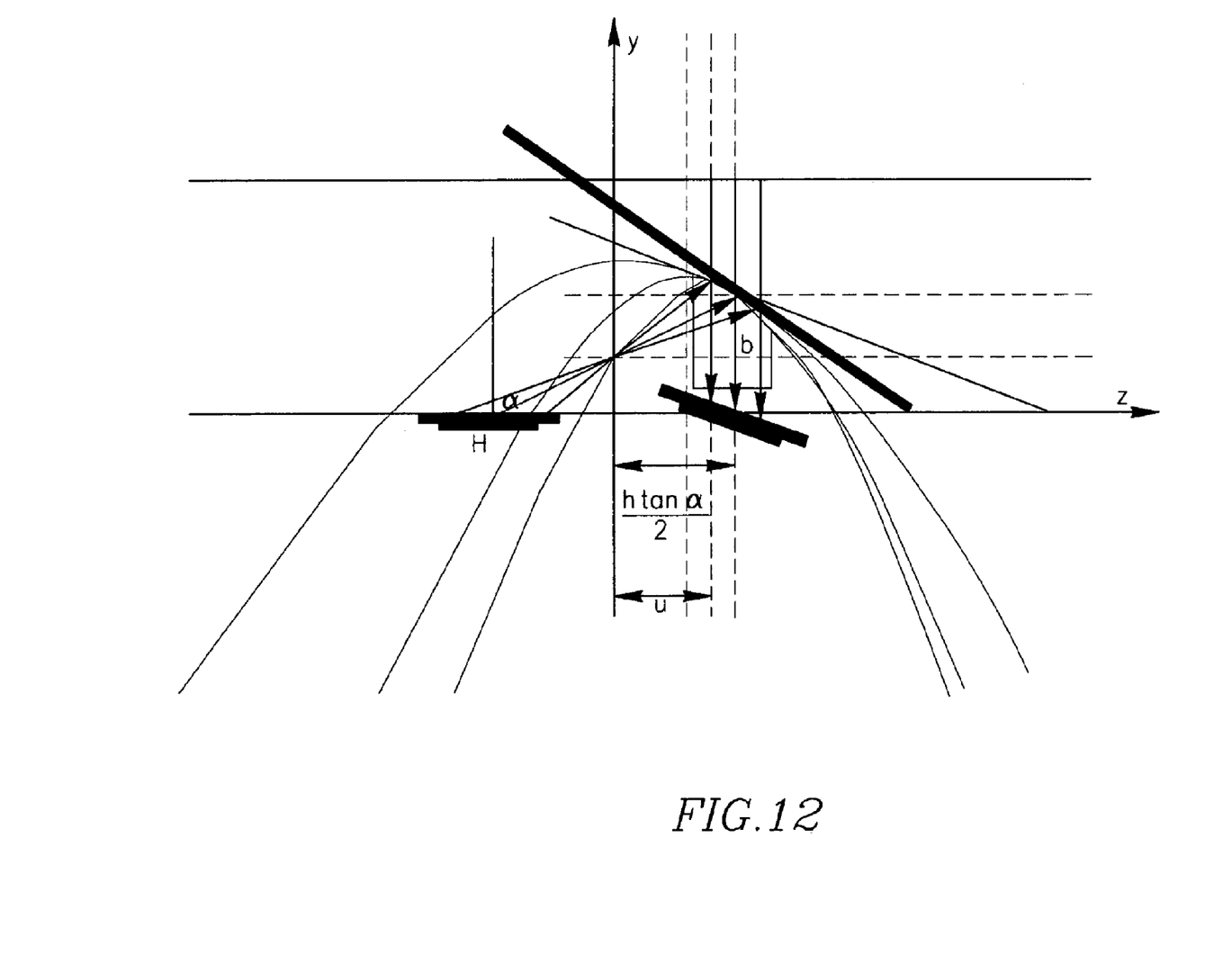
FIG. 12—presents a parabola-family solution that satisfies the model demonstrated.

Thus, the solution reached is a parabola-family as shown in FIG. 12 having the following characteristics:
1. Pass through the point $$\left(\frac{d}{2}, \frac{d}{\tan\alpha}\right)$$

2. Tangent to the parabola at that point will have a slope of $-\beta$

The present invention provides an arrangement that allows two mirrors to be placed apart from each other while optically conceived as if they are located one inside the other, so that any similar arrangement that would yield a similar result should be considered within the scope of the present invention. Furthermore, the examples described above provide an analytical solution for obtaining the geometrical parameters required to construct an optical device in accordance with the present invention. However, as will be appreciated by those skilled in the art, similar processes may be applied in similar ways in order to obtain such parameters, for example through well known computer ray-tracing programs which may be used to specify the best scan mirror tilt, the radii of curvature of the concave mirror, etc.

It is to be understood that the above description only includes some embodiments of the invention and serves for its illustration. Numerous other ways for constructing the optical device provided by the present invention may be devised by a person skilled in the art without departing from the scope of the invention, and are thus encompassed by the present invention.

The invention claimed is:
1. An optical device for projecting a light beam comprising:
a first planar reflector disposed in a path of a focused light beam for deflecting said light beam incident thereon, said planar reflector being movable about a first axis;
a concave reflective surface fixed in position and disposed in a path of said deflected light beam, said concave reflective surface is characterized by having a circular shape extending along at least one of its axis and wherein said reflective surface being spaced apart from said planar reflector by a distance being approximately equal to the radius of said circular shape; and
a second planar reflector moveable about a second axis located in a plane substantially vertical to a plane com- prising said first axis and wherein said second planar reflector is positioned in a path of the light reflected by said concave reflective surface such that said light beam is projected onto a target plane with a substantially flat field of focus.

2. The optical device of claim 1, wherein said concave reflective surface is a two dimensional curvature formed by a spherical shape extending circularly along one of its axis and by another shape extending along another of its axis and selected from the group consisting of a circular shape, a parabolic shape and an elliptic shape.

3. The optical device of claim 2, wherein said another shape is a circular shape.

4. The optical device of claim 3, wherein each of said two circular shapes has a different curvature radius then the other.

* * * * *